United States Patent Office 2,845,946
Patented Aug. 5, 1958

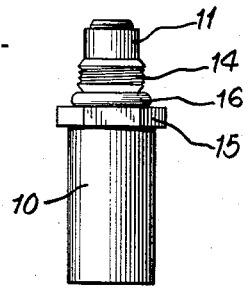
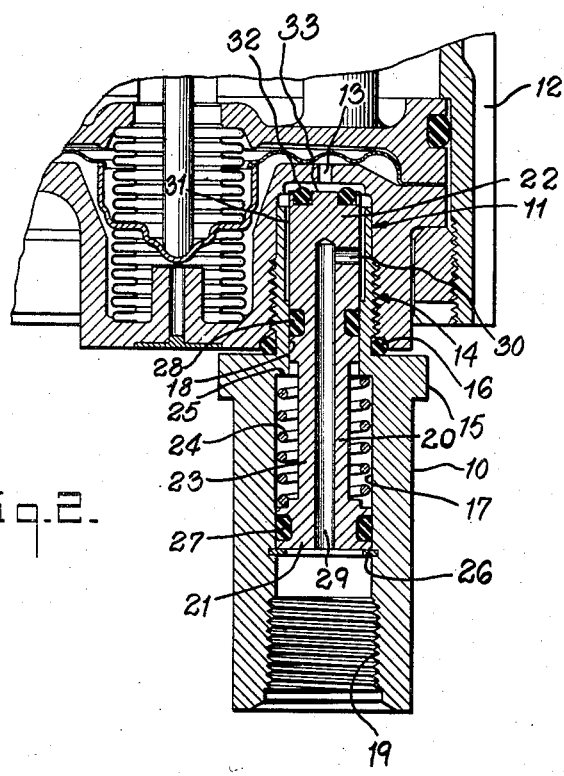

2,845,946

OVERLOAD PROTECTOR FOR FLUID OPERATED APPARATUS

John V. Oliveau, Greenwich, Conn., and Harris J. Shapiro, North White Plains, N. Y., assignors to The Aerotec Corporation, Greenwich, Conn., a corporation of Connecticut Application August 10, 1954, Serial No. 448,969

2 Claims. (Cl. 137—505.13)

Our invention relates to an overload protector to protect sensitive elements of fluid operated apparatus for instruments against the admission of fluid under excessive pressure. It relates more particularly to an overload protector for sensitive aircraft instruments. Such aircraft instruments and other fluid operated apparatus may be designed to operate at relatively low pressures as, for example, at a pressure of four to five inches of mercury. Yet these instruments may be required to withstand a proof pressure of 500 pounds per square inch.

Our invention provides an overload protector to close off the admission of fluid, under a pressure above a predetermined pressure, for example, a pressure above fifty pounds per square inch for apparatus operating at the low pressures mentioned above and to maintain this closure more tightly the greater the pressure applied thereto.

The overload protector of our invention is to be secured or attached to the housing of the apparatus to be protected so as to cover the inlet to said apparatus and prevent admission of fluid thereto except through the overload protector. The overload protector has a cylindrical bore, the diameter of which is reduced in that portion thereof nearest the inlet to the instrument or apparatus to be protected.

A piston is mounted to slide axially in this bore and has a larger piston head in the part of the bore of larger diameter and a smaller piston head in the part of the bore of smaller diameter.

The smaller end of the piston preferably projects through the bore to within a short distance of the inlet to the instrument or apparatus and is provided with a facing, such as an annular ring, which may close about and seal the inlet when the piston is forced inwardly. The outer end of the protector is to be connected fluid tightly with the source of fluid under pressure. The piston is normally maintained out of closing contact or position relative to the inlet to the apparatus by means of a spring.

The protector is provided with a passageway from the part of larger diameter where fluid is admitted to the protector to the opposite end where it delivers fluid to the inlet to the apparatus.

Accordingly the pressure of the fluid is applied over a larger area at the larger piston head tending to force the piston to close onto the inlet to the apparatus and over a smaller area at the opposite end tending to force the piston away from a position to close the inlet to the apparatus. The resilient closing force is equal to the pressure applied to the difference in area of the two piston heads. The spring may be calibrated to withstand this differential force up to a predetermined limit as, for example, fifty pounds.

Preferably the passage from one end of the protector to the other is by way of a passageway extending axially from the piston itself and then sidewise to supply the pressure fluid in such a position that it may be closed by a resilient ring from admission to the inlet of the apparatus to be protected.

The various features of our invention are disclosed, by way of example, in the accompanying drawings in which Fig. 1 is a side view of the overload protector of our invention, and Fig. 2 is a longitudinal section through the overload protector of Fig. 1 taken on a larger scale and through a portion of the apparatus to which it is applied in order to show the manner of attachment and operation.

In the embodiment of the invention shown in the accompanying drawings, the overload protector comprises a housing 10 having a reduced end portion 11 to enter a suitable recess in an instrument or apparatus 12 to be protected, said instrument or apparatus having an inlet opening 13 at the bottom of the recess. The recess may be tapped to receive a threaded part 14 of the reduced end portion 11 of the housing 10.

The housing is flanged at 15 and is provided with a resilient gasket or O-ring 16 held against the flange so that when the housing is screwed into the recess of the instrument the gasket or O-ring is compressed between the flange and the face of the instrument to be protected.

The housing 10 has a cylindrical bore extending longitudinally therethrough, the bore having an outer portion 17 of larger diameter and an end portion 18 extending through the reduced end portion 11 of smaller diameter than that of the part 17. The outer end of the bore is tapped as at 19 for the attachment of a supply of fluid under pressure. It will be understood that the protector thus makes a fluid-tight connection leading to the inlet 13 from the tapped inlet end 19 of the protector.

Slidably mounted within the bore is a piston 20 having a head 21 of larger diameter sliding within the enlarged portion 17 of the bore and a piston head 22 slidable within the portion 18 of reduced diameter. Between the two piston heads 21 and 22 is a connecting neck 23 of reduced diameter to provide a space in which a spring 24 may be confined under suitable pressure or tension between the piston head 21 and a shoulder 25 formed by the stepped end of the bore of the housing. This spring tends to press the piston outwardly or away from the inlet 13 under a calibrated or predetermined pressure. A clip ring or other retaining ring 26 is provided to limit the outward movement of the piston. Packing rings 27 and 28 respectively for the larger and smaller piston heads respectively are provided to insure tightness between the piston heads and the inner surface of the housing.

The piston is provided with a passage 29 extending axially from the larger end thereof to within a short distance of the opposite end and thence through a side passage 30 to an annular space 31 between the circumference of the piston head 22 and the reduced bore 18 of the housing.

As illustrated in the embodiment of Fig. 2, this passage may be formed by enlarging the diameter of the housing bore at this point but might be provided equally well by reducing the diameter of the piston 22 or by both reductions.

The passages 29, 30 and 31 provide a free unobstructed path for fluid from one end of the housing to the opposite end. When the piston is held in normal position by the spring 24 fluid may, therefore, pass through the protector to the inlet part 13. When, however, pressure in the protector housing builds up to the limit for which the spring 24 is calibrated, the difference in pressures between the opposed faces of the pistons 21 and 22 provides a net force which compresses the spring 24 until the end of the smaller piston closes against the inlet 13.

To provide a fluid-tight closure the end of the piston is provided with an annular ring, such as an O-ring 32, tightly enclosing a projection 33 on the end of the piston and mounting the ring 32 in such position that it encircles the passage 13 and closes it from the entrance of fluid. The higher the pressure applied to the protector the greater is the force acting on the piston to compress the ring 32 about the inlet 13 and thus makes the seal tighter as the pressure increases.

Our invention thus provides a protection against injury or distortion of apparatus or instruments designed for operation under low pressures. Because of the application thereto of pressures greatly in excess of those for instruments or apparatus thus designed, it has the advantage also that the greater the pressure the tighter the seal against admission of fluid. Also the protector is of small size and weight, which are of vital importance in airplanes, and of simple construction and few parts to get out of order.

Having described our invention, what we claim is:

1. A pressure overload protected instrument comprising a housing, an instrument within said housing, said housing having an internally threaded recess of substantial depth and an inlet opening to said housing in the inner end of said recess, a valve housing having a delivery end threaded into said recess and threaded at the opposite, receiving, end for connection to a delivery conduit, said valve housing having a cylindrical bore between its ends, said bore being stepped from a lesser diameter adjacent the delivery end in said recess to a larger diameter adjacent the opposite, receiving, end, a piston in said bore stepped from a larger diameter in the larger diameter portion of said bore to a lesser diameter in the lesser diameter of said bore and slidable fluid tightly in said bore, a portion of the bore of lesser diameter adjacent its inner end being enlarged to form with the lesser diameter end of the piston a space in communication with said inlet opening, said piston having a passage from its larger diameter end to said space about its lesser diameter end, a spring biasing said piston toward its larger diameter end and a resilient ring on the end face of the lesser diameter end of said piston to close said inlet opening of said instrument housing when said piston moves to the inner end of said recess.

2. The overload protector of claim 1 in which the larger diameter part of said piston is recessed to form a shoulder, and said bore is formed with a shoulder between the part of lesser diameter and the part of larger diameter spaced from the shoulder of said piston and in which said spring is a coil spring confined between said shoulders.

References Cited in the file of this patent

UNITED STATES PATENTS

| | | |
|---|---|---|
| 396,259 | Bell | Jan. 15, 1889 |
| 572,211 | McCoy | Dec. 1, 1896 |
| 765,849 | Merrill | July 26, 1904 |
| 1,878,002 | Smith | Sept. 20, 1932 |
| 2,417,494 | Hoof | Mar. 18, 1947 |
| 2,590,838 | Boggs | Apr. 1, 1952 |
| 2,726,790 | Woelfer | Dec. 13, 1955 |
| 2,738,803 | Manning | Mar. 20, 1956 |